US012774017B2

(12) United States Patent
Herden et al.

(10) Patent No.: US 12,774,017 B2
(45) Date of Patent: Oct. 27, 2026

(54) SYSTEM FOR PROVIDING OPERATIONAL DATA

(71) Applicant: KNORR-BREMSE SYSTEME FÜR SCHIENENFAHRZEUGE GMBH, Munich (DE)

(72) Inventors: Marc-Oliver Herden, Munich (DE); Thomas Merkel, Hürth (DE); Sebastian Rehberger, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 460 days.

(21) Appl. No.: 17/599,551

(22) PCT Filed: Feb. 28, 2020

(86) PCT No.: PCT/EP2020/055274
§ 371 (c)(1),
(2) Date: Sep. 28, 2021

(87) PCT Pub. No.: WO2020/193073
PCT Pub. Date: Oct. 1, 2020

(65) Prior Publication Data

US 2022/0194444 A1 Jun. 23, 2022

(30) Foreign Application Priority Data

Mar. 28, 2019 (DE) ..................... 10 2019 108 065.7

(51) Int. Cl.
*B61L 15/00* (2006.01)
*G06F 21/31* (2013.01)
(Continued)

(52) U.S. Cl.
CPC ....... *B61L 15/0081* (2013.01); *B61L 15/0027* (2013.01); *G06F 21/31* (2013.01);
(Continued)

(58) Field of Classification Search
CPC .......... G06F 21/31; G06F 21/44; G06F 21/60; G07C 5/008; G07C 5/0808; G07C 5/085
See application file for complete search history.

(56) References Cited

U.S. PATENT DOCUMENTS 10,915,083 B2 * 2/2021 Hagihara ............... G06Q 10/08
2003/0191581 A1 10/2003 Ukai et al.
(Continued)

FOREIGN PATENT DOCUMENTS

CN 1696739 A 11/2005
CN 103329173 A 9/2013
(Continued)

OTHER PUBLICATIONS

Uita, Iris et al.; Der QR-Code-aktuelle Entwicklungen und Anwendungsbereiche; Hauptbeitrag/Der QR-Code; Springer-Verlag 2012; Informatik Sprektrum; pp. 339-347.
(Continued)

*Primary Examiner* — David P. Merlino
*Assistant Examiner* — Mahmoud M Kazimi
(74) *Attorney, Agent, or Firm* — Barnes & Thornburg LLP

(57) ABSTRACT

A system for providing operational data of a vehicle component, in particular of a component of an air supply system of a rail vehicle, includes at least one detector for capturing the operational data of the vehicle component; a transmitter coupled to the at least one detector, for transmitting the operational data of the vehicle component to an external memory device for storing the operational data; and an identification number of the component, the number being provided on the vehicle component.

7 Claims, 2 Drawing Sheets

(51) Int. Cl.

| | |
|---|---|
| ***G06F 21/44*** | (2013.01) |
| ***G06F 21/60*** | (2013.01) |
| ***G07C 5/00*** | (2006.01) |
| ***G07C 5/08*** | (2006.01) |

(52) U.S. Cl.

CPC .............. *G06F 21/44* (2013.01); *G06F 21/60* (2013.01); *G07C 5/008* (2013.01); *G07C 5/0808* (2013.01); *B61L 2205/02* (2013.01)

(56) References Cited

U.S. PATENT DOCUMENTS

| | | | | |
|---|---|---|---|---|
| 2005/0253726 | A1* | 11/2005 | Yoshida | B60R 25/04 340/572.8 |
| 2013/0293349 | A1* | 11/2013 | Templ | G07F 15/005 340/5.61 |
| 2016/0147521 | A1 | 5/2016 | Hieronymi | |
| 2018/0095638 | A1* | 4/2018 | Merg | G06F 3/04817 |
| 2019/0023296 | A1* | 1/2019 | Köhler | G06Q 10/087 |

FOREIGN PATENT DOCUMENTS

| | | | | | |
|---|---|---|---|---|---|
| CN | 106157392 | A | | 11/2016 | |
| CN | 108768972 | A | | 11/2018 | |
| DE | 19933302 | A1 | | 2/2001 | |
| DE | 102006030046 | A1 | * | 1/2008 | G07C 5/008 |
| DE | 102007050994 | A1 | * | 4/2009 | G07C 5/006 |
| DE | 102013003044 | A1 | | 8/2014 | |
| DE | 102013203943 | A1 | | 9/2014 | |
| DE | 102013212351 | A1 | | 12/2014 | |
| DE | 102016221086 | A1 | | 4/2018 | |
| DE | 102017215225 | A1 | * | 2/2019 | |
| EP | 1081670 | A2 | | 3/2001 | |
| WO | 2008000603 | A1 | | 1/2008 | |
| WO | 2019042615 | A1 | | 3/2019 | |

OTHER PUBLICATIONS

International Search Report and Written Opinion corresponding to PCT/EP2020/055274 dated Jun. 4, 2020.

* cited by examiner

SYSTEM FOR PROVIDING OPERATIONAL DATA

CROSS REFERENCE AND PRIORITY CLAIM

This patent application is a U.S. National Phase of International Patent Application No. PCT/EP2020/055274 filed Feb. 28, 2020, which claims priority to German Patent Application No. 10 2019 108 065.7, the disclosure of which being incorporated herein by reference in their entireties.

FIELD

Disclosed embodiments relate to a system for providing operational data of a vehicle component, in particular of a component of an air supply system of a rail vehicle, and to a corresponding method.

BACKGROUND

Conventionally, operational data of a component of a vehicle are acquired by a meter or sensor on the device, and read by a technician as necessary.

However, this technique comprises disadvantages. Errors may occur when reading the operational data, and the management of the operational data is cumbersome, as the data must be assigned to a device in a table and entered correctly. Furthermore, this process may also result in errors. In addition, the data must be read on the device on-site.

SUMMARY

Disclosed embodiments provide an improved system for providing operational data, via which the disadvantages of the prior art can be avoided by providing operational data of a vehicle component and a method as disclosed herein.

BRIEF DESCRIPTION OF FIGURES

Further characteristics and advantages of the disclosed embodiments will become apparent from the following description, with reference to the attached drawing, in which.

DETAILED DESCRIPTION

Figure 1:
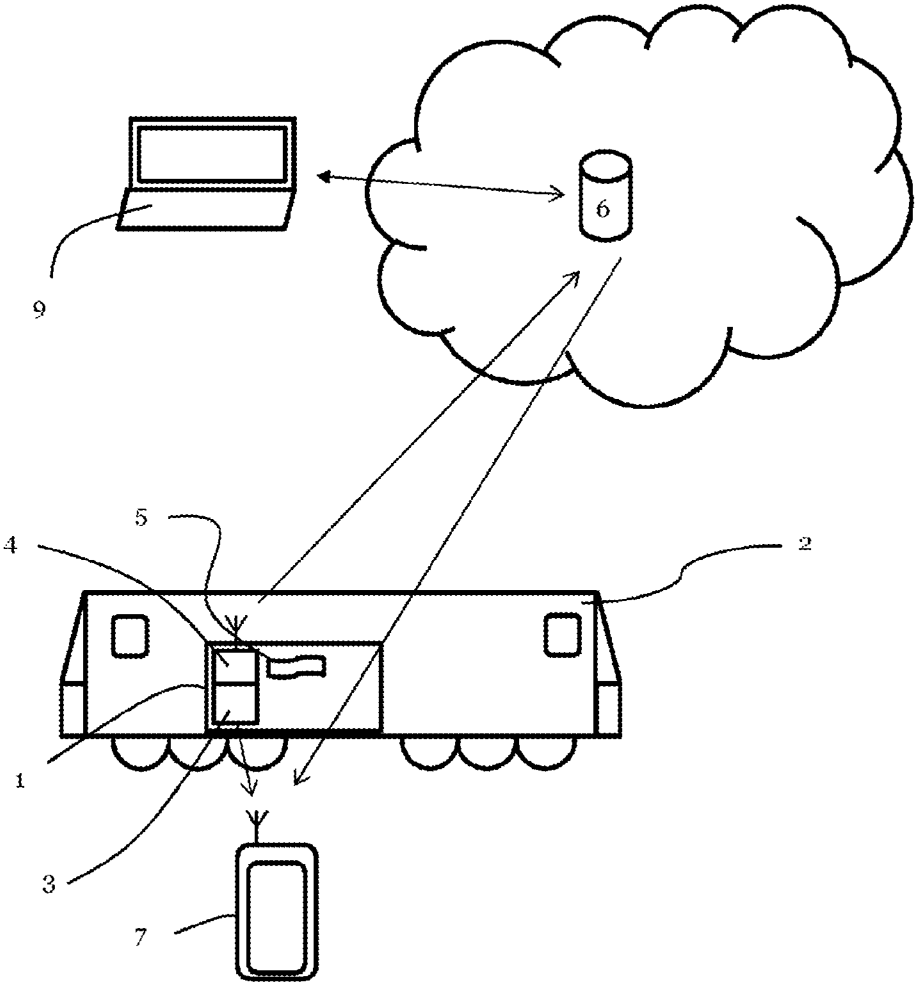
FIG. 1 schematically depicts an exemplary embodiment of the system.

Disclosed embodiments provide a system is provided for providing operational data of a vehicle component, in particular of a component of an air supply system of a rail vehicle, the system comprising at least one detector for acquiring the operational data of the vehicle component, a transmitter coupled to the detector for transmitting the operational data of the vehicle component to an external storage device for storing the operational data, and a component identification number or link which is arranged on the vehicle component.

Via the system according to the disclosed embodiments, operational data of the vehicle component, for example, of an air supply system of a rail vehicle, may be acquired, in particular automatically, and possibly at regular time intervals, and transmitted to an external storage device, for example, a cloud or a data center, where the data can be stored and read or retrieved by a technician for maintenance of the vehicle component. In addition, the data can also be evaluated without being on site at the device.

In the external storage device, the operational data are stored in a manner, which is associable with the vehicle component, for example, linked to the identification number or a corresponding link, in particular a hyperlink.

In order to be able to read or retrieve the data of the vehicle component which are stored in the external storage device, an identification number must be acquired which corresponds to the vehicle component and which also can act as an authentication when reading or retrieving. The acquisition may take place, for example, by reading an identification number attached to the vehicle component. However, other types of acquisition are conceivable, for example, wireless transmission of the identification number from the vehicle component to a user by a transponder via a radio signal, or keyboard input by the user.

The vehicle component may, for example, be an air supply system, a compressor, a filter system or a drying system for air, an air conditioning system, a heating system, or another component of a vehicle, in particular a rail vehicle or commercial vehicle. The detector may be an operating hours meter, a sensor for acquiring measured data such as pressure, temperature, humidity, sound intensity, or a diagnostic unit which, in addition to its suitability for acquiring operational data, also has a data processing unit via which the operational data can be processed and stored locally.

By acquiring the operational data according to the disclosed embodiments, possibly automatically, errors when reading and storing the operational data can be avoided. In addition, the operational data are immediately available for processing in electronic form. In addition, periodic acquisition and storage of the operational data can be ensured, whereby it becomes possible to monitor and maintain the vehicle component based on the operational data.

According to one embodiment, the vehicle component comprises a smart tag, RFID, or a QR code, in which at least the identification number of the component, or a link to the external storage device (6), or both, are stored. By storing the identification number on a smart tag, in an RFID or a QR code, reading and acquisition can take place electronically with the aid of a suitable, optionally portable, user device, for example, a conventional mobile radio device.

If, alternatively or in addition, a link, in particular a hyperlink, to the external storage device is stored on the smart tag, RFID, or QR code, the operational data stored in the external storage device can be retrieved immediately via the link, in particular a hyperlink, without an identification number of the vehicle component being required for this purpose. With the aid of the smart tag, the identification number of the vehicle component can be linked directly to a corresponding hyperlink to the operational data in the external storage device in the form of an Internet address.

According to a further embodiment, the transmitter is a radio transmitter, in particular a mobile radio transmitter, which is configured to transmit according to at least one mobile radio standard. The mobile radio standard may be narrowband IoT, 2G, 3G, LTE, or another technology, for example, WLAN, Bluetooth, IR, etc.

According to another embodiment, the system also comprises a receiver or transceiver via which data or commands can be received at the vehicle component. The receiver or transceiver may be a device which is configured to receive radio signals according to a mobile radio standard, WLAN, LAN, Bluetooth, IR, etc.

According to still another embodiment, the system furthermore comprises a user device which is configured to acquire the identification number of the component, to communicate with the external storage device, and to receive the operational data from the external storage device. The device may be a mobile radio device, for example, a mobile telephone, a portable computing device or computer, a tablet computer, or another device via which the identification number of the component can be acquired and stored. For example, the user device may have a scanner or scanning function via which the identification number, QR code, or smart tag attached to the vehicle component can be read. Alternatively or in addition, the user device may comprise a transceiver for reading a smart tag, RFID, or transponder.

According to one embodiment, the external storage device is configured to allow transmission of the operational data to the user device after authentication of the user device or user. As a result, the operational data can be protected against misuse and unauthorized reading or manipulation.

According to still another embodiment, the external storage device is configured to carry out the authentication of the user device by a comparison of the identification number of the vehicle component transmitted from the user device to the external storage device with the identification number associated with the operational data in the external storage device. This form of authentication provides a certain degree of protection against misuse of the stored operational data, as only a user which is in possession of the corresponding identification number of the vehicle component receives access to the operational data.

In addition, however, it is also conceivable to encrypt the operational data at the detector and/or in the external storage device, or to protect the operational data with a password, before the operational data are transmitted.

According to a further embodiment, the external storage device is configured to be connected to a computing device via which the stored operational data can be processed. In this way, it is possible to process and to store the operational data of the vehicle component transmitted by the detector and stored in the external storage device, and to make the data available to a user in processed form via the user device.

According to another embodiment, the external storage device is configured to transmit the processed operational data to the user device, or is configured such that the processed operational data can be retrieved by the user device by a link. However, it is also conceivable to connect the external storage device to another computing device, so that the data can be transmitted to the computing device. The transmission of the operational data to the user device or the retrieval by the user device may take place by mobile radio, another radio technology, or via the Internet.

According to disclosed embodiments, furthermore, a method is provided for providing operational data of a vehicle component, in particular, of a component of an air supply system of a rail vehicle, the method comprising acquiring the operational data of the vehicle component, transmitting the operational data of the vehicle component to an external storage device, storing the operational data, acquiring an identification number of the vehicle component or a link to the operational data via a user device, transmitting the identification number of the vehicle component or the link to the external storage device, and transmitting the operational data from the external storage device to the user device using the identification number, or retrieving the operational data from the external storage device to the user device using the link.

In particular, the operations of the method may be automated and executed repeatedly at predetermined time intervals by a computing device.

Similarly to the device, the method provides the advantage that operational data of a vehicle component can be automatically acquired, stored, and made available to a user, thereby avoiding human intervention and errors in the data acquisition.

According to one embodiment, the method further comprises transmitting the operational data to the user device only after successful authentication of the user via the user device. As a result, the operational data can be protected against misuse and manipulation. In addition, the data may also be encrypted or protected via a password.

According to a further embodiment, the method further comprises identifying the operational data in the external storage device by comparing the identification number of the vehicle component transmitted from the user device to the external storage device with the identification number associated with the operational data in the external storage device, or verifying the link in the external storage device. As a result, it is possible to protect the data against misuse, since only users who are in possession of the identification number of the vehicle component or the link receive access to the operational data.

According to another embodiment, the transmission of the operational data of the vehicle component to the external storage device takes place at least partially by mobile radio. This is advantageous in particular in the case of components arranged in a rail vehicle, as the operational data can be transmitted essentially independently of location, as soon as the rail vehicle is in the range of a radio network.

In addition, according to disclosed embodiments, a computer-readable medium is provided, on which instructions are stored which carry out the method described above when they are executed by a computing device.

Below, an embodiment of the system is described with reference to the figures. The system depicted in FIG. 1 comprises a detector 3 for acquiring the operational data of a vehicle component 1 of a rail vehicle 2. The vehicle component 1 may, for example, be an air supply system of the rail vehicle 2 or a component thereof. The detector 3 may be configured to measure the operating hours of the air supply system or individual components thereof. The detector 3 may comprise a data processing unit, for example, a microprocessor, via which the acquired data can be processed, and a local memory in which the data can be stored. In addition, the detector is connected to a transmitter 4, via which the acquired or stored operational data can be transmitted via an antenna into a mobile radio network which is connected to an external storage device 6, for example, a cloud. The acquisition and transmission of the operational data to the external storage device 6 may take place automatically and according to a predetermined schedule. The acquisition and transmission of the operational data may also be triggered by measurement parameters, for example, temperature, pressure, duration, etc.

The transmitted operational data are stored in the storage device 6 along with an identification number 5 of the vehicle component 1, so that an association between the stored operational data and the vehicle component 1 is possible. It may be necessary to process the operational data stored in the external storage device 6 via a computing device 9 and then to store it again in the external storage device 6. For this purpose, the computing device 9 may be connected to the external storage device 6, for example, via the Internet or another network or a data line. The data may, for example, be processed by maintenance personnel of the vehicle component 1.

A user device 7, for example, a mobile telephone or a tablet computer, may be connected to the external storage device 6 via a mobile radio connection or the Internet or a combination of the two. In order to be able to retrieve operational data from the external storage device 6 via the user device 7, the identification number 5 of the vehicle component 1 must be transmitted to the external storage device 6 or a corresponding link or hyperlink. By this process, the operational data in the external storage device 6 can be at least roughly protected against misuse. The identification number 5 of the vehicle component 1 may be obtained by reading it either directly on the vehicle component 1 via a scanner of the user device 7 as a bar code or QR code, or by reading an RFID or transponder attached to the vehicle component 1. Instead of the identification number 5, a link may also be used, via which the data can be retrieved from the external storage device 6 by the user device 7, and which is also used for authentication. The link may, for example, be contained in a smart tag or the RFID.

Figure 2:
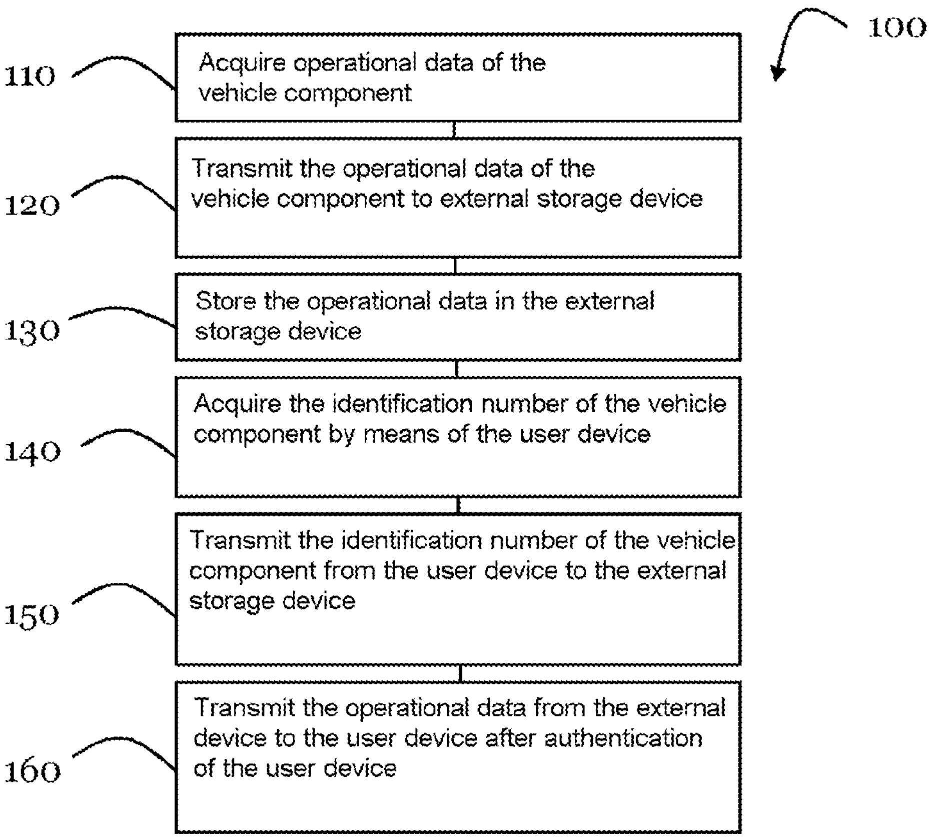
FIG. 2 depicts a flow chart of a method according to an exemplary embodiment.

FIG. 2 schematically depicts a corresponding method for providing operational data. In a first operation 110, the operational data of the vehicle component are acquired. The acquisition may, for example, take place by a detector 3 or meter arranged on the vehicle component 1. The acquisition may be carried out automatically and periodically at fixed time intervals. The operational data of the vehicle component, for example, the status of an hour meter, are transmitted 120 to an external storage device 6 with the aid of a transmitter 4 which is coupled to the detector 3, and stored 130 there along with an identification number 5 of the vehicle component which is associated with the operational data. In order to obtain access to the stored operational data, a user must gain knowledge of the identification number 5 of the vehicle component 1 or a corresponding link to the operational data. This may take place by scanning the identification number attached to the vehicle component or the corresponding link via a mobile user device 7 in close proximity to the vehicle component 1. By transmitting 150 the identification number 5 of a corresponding link by the user device 7 to the external storage device 6, authentication of the user can take place, whereby reading or retrieving the operational data is permitted. The transmission 160 of operational data from the external storage device to the user device using the identification number enables access to the operational data which are needed in order to perform maintenance of the vehicle component. The transmission of the data from the detector to the external storage device 6 and from the external storage device 6 to the user device 7 may take place via the mobile radio network.

Optionally, the method may comprise transmitting the operational data to the user device 7 only after successful authentication by the user device. The authentication may already be performed by specifying the identification number 5 of the vehicle component 1 associated with the operational data or the link for retrieving the data, or alternatively or additionally by entering a password into a user interface.

When the operational data is retrieved, the operational data in the external storage device 6 may be identified by a comparison of the identification number 5 of the vehicle component 1 transmitted from the user device 7 to the external storage device 6 with the identification number 5 associated with the operational data in the external storage device.

Numerous modifications may be made to the described embodiments without departing from the scope of the disclosed embodiments.

LIST OF REFERENCE CHARACTERS

1 Vehicle component
2 Rail vehicle
3 Detector
4 Transmitter
5 Identification number
6 External storage device
7 User device

The invention claimed is:

1. A system for automatically acquiring, transmitting, storing, accessing, and providing remote, controlled access to operational data of a component of an air supply system of a rail vehicle, the system comprising:

at least one detector having a sensor for automatically acquiring the operational data of a vehicle component during operation of the rail vehicle;

a transmitter coupled to the at least one detector for automatically transmitting the operational data of the vehicle component to a remote external storage device for storing the operational data linked to a hyperlink for the remote external storage device; and a component identification number which is arranged on the vehicle component, wherein the vehicle component further comprises the hyperlink, a user device which is configured to acquire the identification number of the component and the hyperlink to communicate with the remote external storage device, and to receive processed operational data from the remote external storage device via the hyperlink, wherein the operational data of the vehicle component is stored with the component identification number in the remote external storage device, wherein the remote external storage device is configured to be connected to a computing device with which the operational data is processed, and is configured to enable the processed operational data to be retrieved by the user device via the hyperlink, wherein the remote external storage device is configured to permit transmission of the processed operational data to the user device only after authentication of the user device, and wherein the remote external storage device is configured to carry out the authentication of the user device by a comparison of the identification number of the vehicle component transmitted from the user device to the remote external storage device with the identification number associated with the operational data in the remote external storage device.

2. The system of claim 1, wherein the vehicle component furthermore comprises a smart tag, RFID, or a QR code, in which at least the identification number of the component and the hyperlink to the external storage device are stored.

3. The system of claim 1, wherein the transmitter is a mobile radio transmitter, which is configured to transmit according to a mobile radio standard.

4. The system of claim 1, wherein the external storage device is configured to transmit the processed operational data to the user device, or is configured such that the processed operational data is retrievable by the user device using the hyperlink.

5. A method for automatically acquiring, transmitting, storing, accessing, and providing remote, controlled access to operational data of a component of an air supply system of a rail vehicle, the method comprising:

automatically acquiring the operational data of a vehicle component via a sensor during operation of the rail vehicle;

automatically transmitting the operational data of the vehicle component to an external storage device and storing the operational data linked to a hyperlink for the external storage device, wherein the external storage device is configured to be connected to a computing device with which the operational data is processed, and is configured to enable the processed operational data to be retrieved by the user device via the hyperlink;

acquiring an identification number of the vehicle component or the hyperlink via scanning by a user device, wherein the vehicle component further-comprises the hyperlink, transmitting the identification number of the vehicle component to the external storage device;

identifying the operational data in the external storage device by a comparison of the identification number of the vehicle component transmitted from the user device to the external storage device with the identification number associated with the operational data in the external storage device; and transmitting the operational data from the external storage device to the user device using the identification number, wherein transmitting the operational data to the user device occurs only after successful authentication of the user device.

6. The method of claim 5, wherein the transmission of the operational data of the vehicle component to the external storage device takes place at least partially by mobile radio.

7. A non-transitory computer-readable medium on which instructions are stored, which carry out the method of claim 5 when they are executed by a computing device.

* * * * *